(12) United States Patent
Park

(10) Patent No.: US 9,967,468 B2
(45) Date of Patent: May 8, 2018

(54) PHOTOGRAPHING APPARATUS AND PHOTOGRAPHING METHOD

(71) Applicant: SAMSUNG ELECTRONICS CO., LTD., Suwon-si (KR)

(72) Inventor: Kyong-tae Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 16 days.

(21) Appl. No.: 14/824,275

(22) Filed: Aug. 12, 2015

(65) Prior Publication Data

US 2016/0073030 A1 Mar. 10, 2016

(30) Foreign Application Priority Data

Sep. 5, 2014 (KR) .................. 10-2014-0118967

(51) Int. Cl.
*H04N 5/232* (2006.01)
*G06F 3/041* (2006.01)

(52) U.S. Cl.
CPC ......... *H04N 5/23293* (2013.01); *G06F 3/041* (2013.01); *H04N 5/23212* (2013.01)

(58) Field of Classification Search
CPC . H04N 5/23293; H04N 5/23212; G06F 3/041
See application file for complete search history.

(56) References Cited

U.S. PATENT DOCUMENTS

| 8,077,249 B2 * | 12/2011 | Huang | H04N 5/23293 348/345 |
| 8,085,332 B2 * | 12/2011 | Mori | G06F 3/0412 348/333.01 |
| 8,106,999 B2 * | 1/2012 | Izawa | G02B 7/36 348/333.02 |

(Continued)

FOREIGN PATENT DOCUMENTS

| JP | 2012-147100 A | 8/2012 |
| JP | 2012-191570 A | 10/2012 |

(Continued)

OTHER PUBLICATIONS

Communication dated Dec. 17, 2015 issued by the Int. Searching Authority in counterpart Application PCT/KR2015/009013 (PCT/ISA/210).

(Continued)

*Primary Examiner* — Padma Haliyur
(74) *Attorney, Agent, or Firm* — Sughrue Mion, PLLC

(57) ABSTRACT

A photographing apparatus and a photographing method are provided. The photographing apparatus includes: a viewfinder configured to display a live image; a display configured to display the live image and receive a touch input; and a controller configured to activate at least one selected from the viewfinder and the display according to whether a user approaches the photographing apparatus and activate a set area of a display area of the display for performing an autofocusing function in response to the viewfinder being activated. The set area is an area where a touch for setting (Continued)

an autofocusing area of the live image displayed through the viewfinder is input. Therefore, the user intuitively performs autofocusing on the live image with observing the live image displayed through the viewfinder.

24 Claims, 11 Drawing Sheets

(56) References Cited

U.S. PATENT DOCUMENTS

| | | | | |
|---|---|---|---|---|
| 8,547,468 | B2* | 10/2013 | Churei | G03B 13/02 |
| | | | | 348/333.02 |
| 8,743,270 | B2* | 6/2014 | Hamada | H04N 5/23209 |
| | | | | 348/345 |
| 9,001,255 | B2* | 4/2015 | Matsuzawa | H04N 5/23212 |
| | | | | 348/333.01 |
| 2007/0018069 | A1 | 1/2007 | Higashino | |
| 2012/0113056 | A1* | 5/2012 | Koizumi | H04N 5/232 |
| | | | | 345/175 |
| 2013/0039583 | A1 | 2/2013 | Ichimasa et al. | |
| 2014/0015989 | A1* | 1/2014 | Shibuno | G03B 13/36 |
| | | | | 348/208.12 |
| 2014/0085525 | A1 | 3/2014 | Ishihara et al. | |
| 2014/0098273 | A1 | 4/2014 | Ito et al. | |

FOREIGN PATENT DOCUMENTS

| | | |
|---|---|---|
| JP | 2013-80996 A | 5/2013 |
| JP | 2014-68400 A | 4/2014 |
| JP | 2014-78855 A | 5/2014 |
| KR | 10-2010-0008888 A | 1/2010 |
| KR | 10-1261401 B1 | 5/2013 |

OTHER PUBLICATIONS

Communication dated Dec. 17, 2015 issued by the Int. Searching Authority in counterpart Application PCT/KR2015/009013 (PCT/ISA/237).

* cited by examiner

PHOTOGRAPHING APPARATUS AND PHOTOGRAPHING METHOD

CROSS-REFERENCE TO RELATED APPLICATION

This application claims priority under 35 U.S.C. § 119 from Korean Patent Application No. 10-2014-0118967, filed on Sep. 5, 2014, in the Korean Intellectual Property Office, the disclosure of which is incorporated herein by reference in its entirety.

BACKGROUND

1. Field

Apparatuses and methods consistent with exemplary embodiments generally relate to providing a photographing apparatus and a photographing method, and more particularly, to providing a photographing apparatus and a photographing method that enable autofocusing.

2. Description of Related Art

In general, a photographing apparatus, such as a compact system camera (CSC) to which an electronic viewfinder (EVF) is applied, does not include an additional mirror box in a barrel, like a digital single-lens reflex (DSLR) camera to which an optical viewfinder (OVF) is applied. Therefore, the photographing apparatus, to which the EVF is applied, has a thinner profile and a lighter weight than a DSLR camera, and thus has been widely used by users.

In detail, the photographing apparatus to which the EVF is applied, turns on one of the EVF and a display panel formed on a back surface of the photographing apparatus to display a live image according to whether a user approaches the photographing apparatus.

In other words, if eyes of the user approaches the EVF, the photographing apparatus turns off the display panel and turns on the EVF. Therefore, the user may observe the live image that is displayed through the EVF. If the eyes of the user do not approach the EVF, the photographing apparatus turns off the EVF and turns on the display panel. Therefore, the user may observe the live image that is displayed through the display panel.

The photographing apparatus as described above performs autofocusing on a subject to be captured, based on a preset reference position. Therefore, according to the above-described method, if a touch command is input from the user when the autofocused live image is displayed through the display panel, the photographing apparatus may re-perform autofocusing on one of areas of the live image corresponding to a touch area of the user.

However, if the autofocused live image is displayed through the EVF, the display panel operates in an inactive mode as described above. Therefore, the user may not perform an autofocusing-related manipulation on a desired area with observing the live image that is displayed through the EVF.

SUMMARY

Exemplary embodiments address at least the above problems and/or disadvantages and other disadvantages not described above. Also, exemplary embodiments are not required to overcome the disadvantages described above, and an exemplary embodiment may not overcome any of the problems described above.

Exemplary embodiments provide a photographing apparatus and a photographing method that display a live image and easily perform an autofocusing manipulation through a viewfinder.

According to an aspect of an exemplary embodiment, there is provided a photographing apparatus including: a viewfinder configured to display a live image; a display configured to display the live image and receive a touch input; and a controller configured to activate at least one selected from the viewfinder and the display according to an eye point distance between a user and the photographing apparatus; and activate a focus control area of the display for performing an autofocusing function in response to the viewfinder being activated. The focus control area may be an area where a touch for setting an autofocusing area of the live image displayed through the viewfinder is input.

The controller may be further configured to determine the autofocusing area by matching corresponding values of the focus control area with coordinate values of the live image on a one-to-one correspondence basis.

In response to a touch being input on a first area of the set area, the controller may determine an area of the live image having coordinate values corresponding to coordinate values of the first area as the autofocusing area.

The photographing apparatus may further include a sensor configured to sense the eye point distance. In response to the eye point distance being less than a preset threshold distance, the controller may turn on the viewfinder and the focus control area and turn off other areas of the display area except the focus control area.

The controller may be configured to perform single autofocusing on an area corresponding to the autofocusing area in response to an area of the touched first area being less than a preset threshold area and perform multi autofocusing on the autofocusing area in response to the area of the touched first area being greater than or equal to the preset threshold area.

In response to a touch pattern of the touch input on the focus control area being a preset pattern, the controller may perform multi autofocusing on the autofocusing.

The photographing apparatus may further include a storage configured to store captured images and information corresponding to the captured images. The controller may determine an area that displays an interested object among a plurality of objects in the live image as the autofocusing area, based on the information corresponding to the captured images stored in the storage.

The photographing apparatus may further include an input configured to receive a user command. In response to autofocusing being performed on the area that displays the interested object and an autofocusing change command being input through the input, the controller may determine an area that displays at least one object belonging to a preset category among other objects as the autofocusing area.

In response to two of the plurality of objects belonging to the preset category, the controller may determine an area that displays one of the plurality of objects according to a selection command input through the input.

The controller may adjust at least one selected from a position and a size of the focus control area according to a user command.

According to another aspect of an exemplary embodiment, there is provided a photographing method of a photographing apparatus, the photographing method including: determining at least one selected from a viewfinder and a display to activate, according to an eye point distance between a user and the photographing apparatus; in response to the viewfinder being activated, displaying a live image through the viewfinder; activating a focus control area of the display for performing an autofocusing function; and in response to a touch being input on the activated focus control area, performing autofocusing on the live image displayed through the viewfinder. The focus control area may be an area for setting an autofocusing area of the live image displayed through the viewfinder.

The autofocusing area may be determined by matching coordinate values of the focus control area with coordinate values of the live image on a one-to-one correspondence basis.

In response to a touch being input on a first area of the focus control area, the autofocusing area may be determined as an area of the live image having coordinate values corresponding to coordinate values of the first area.

In response to the eye point distance being less than a preset threshold distance, the viewfinder may be activated and the display area except focus control area may be turned off.

Single autofocusing may be performed in response to an area of the touched first area being less than a preset threshold area, and multi autofocusing may be performed in response to the area of the touched first area being greater than or equal to the preset threshold area.

In response to a touch pattern of the touch input on the focus control area corresponding to a preset pattern, multi autofocusing may be performed on the autofocusing area.

The method may further include determining an interested object among a plurality of objects in the live image as the autofocusing area based on pre-stored information corresponding to the captured images.

The determining may further include, in response to autofocusing being performed on the area that displays the interested object and an autofocusing change command being input, determining an area that displays at least one object belonging to a preset category among other objects as the autofocusing area.

In response to two of the plurality of objects belonging to the preset category, an area may be determined that displays one of the plurality of objects according to a selection command of the user as the autofocusing area.

The autofocusing may further include adjusting at least one selected from a position and a size of the set area according to a user command.

According to an aspect of another exemplary embodiment, an imaging apparatus includes: a first display configured to be viewed through a viewfinder; a second display comprising a touch panel; an imager comprising a focusable lens and configured to capture an outside image; a sensor configured to sense a user distance between a user and the imaging apparatus; and a controller configured to: compare the user distance to a threshold value; and in response to determining that the user distance is less than the threshold value, control the first display to display the outside image and control the focusable lens based on an input to the touch panel.

The controller may be further configured to control an autofocusing area of the outside image based on the input.

The controller may be further configured to determine an interested object of a plurality of objects in the outside image and control an autofocusing area of the outside image based on the interested object.

The interested object may be determined based on focal points of stored images.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
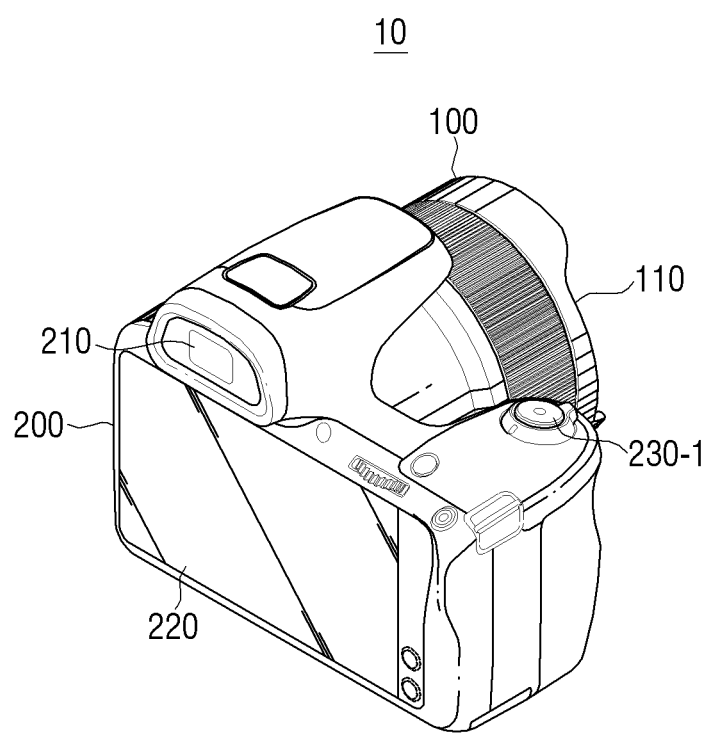
FIG. 1 is a view illustrating a photographing apparatus according to an exemplary embodiment.

Exemplary embodiments are described in greater detail with reference to the accompanying drawings.

In the following description, the same drawing reference numerals are used for the same elements, even in different drawings. The matters defined in the description, such as detailed construction and elements, are provided to assist in a comprehensive understanding of exemplary embodiments. Thus, it is apparent that exemplary embodiments can be carried out without those specifically defined matters. Also, well-known functions or constructions may not be described in detail. Expressions such as "at least one of," when preceding a list of elements, modify the entire list of elements and do not modify the individual elements of the list.

FIG. 1 is a view illustrating a photographing apparatus 10 according to an exemplary embodiment.

As shown in FIG. 1, the photographing apparatus 10 may be realized as, for example, a digital still camera that captures a still image, a digital video camera that captures a moving image, etc. The photographing apparatus 10 includes a barrel 100 and a main body 200.

The barrel 100 includes a plurality of lenses 110 to focus external image light as an image on an imaging surface of the main body 200. Here, the plurality of lenses 110 may include a zoom lens that zooms in or out and a focus lens that adjusts a focus. Distances between the plurality of lenses 110 may be changed by a driver such as a zoom motor. The distances between the plurality of lenses 110 may be changed to adjust a zoom magnification, the focus, etc. of a subject to be captured.

The barrel 100 that includes the plurality of lenses 110 may be realized as an internal component of the main body 200 or may be attachable to and separable from the main body 200.

The main body 200 encloses various types of elements of the photographing apparatus 10 to protect the various types of element from an external environment and support the various types of elements. The main body 200 displays a live image through at least one of the viewfinder 210 and a display 220.

According to exemplary embodiments, the viewfinder 210 may be realized as an electronic viewfinder (EVF) or an optical viewfinder (OVF). For example, the EVF may be applied to a compact system camera (CSC), and the OVF may be applied to a digital single-lens reflex (DSLR) camera.

The photographing apparatus 10 to which the OVF is applied may optically observe the subject to be captured through the OVF through a reflective mirror of a mirror box formed in the barrel 100.

The photographing apparatus 10 to which the EVF is applied converts image light of the subject to be captured into an electric signal, converts the electric signal into image data to generate a live image, and displays the live image through at least one of the viewfinder 210 and the display 220.

In other words, the photographing apparatus 10 to which the EVF is applied may provide the live image of the subject to be captured without an additional mirror box, like the DSLR camera, to keep an image quality of the DSLR camera, and effectively reduce a weight and a thickness, in comparison with the DSLR camera.

The viewfinder 210 of the photographing apparatus 10 may be applied as an EVF or an OVF, and will be described as the EVF.

As described above, if the viewfinder 210 is the EVF, the photographing apparatus 10 senses a distance between the viewfinder 210 and eyes of a user, and displays the live image of the subject to be captured on the viewfinder 210 or the display 220 according to the sensed distance. In detail, if the sensed distance between the viewfinder 210 and the eyes of the user is greater than or equal to a preset threshold distance, the photographing apparatus 10 turns off the viewfinder 210 and turns on the display 220. Therefore, if the display 220 is activated, the photographing apparatus 10 may display the live image of the subject to be captured through the display 220. If a touch of the user is input while the live image is displayed, the photographing apparatus 10 performs autofocusing on an area of the live image corresponding to the input touch. If a shutter 230-1 of an input 230 is pressed by the user, the photographing apparatus 10 captures the autofocused live image in response to the touch of the user.

If the sensed distance between the viewfinder 210 and the eyes of the user is less than the preset threshold distance, the photographing apparatus 10 turns off the display 220 and turns on the viewfinder 210. Therefore, while the viewfinder 210 is activated, the photographing apparatus 10 may transmit the live image of the subject to be captured to the viewfinder 210, so as to enable the live image to be displayed through the viewfinder 210.

Here, the photographing apparatus 10 turns off other areas of the display 220 except an area of the display 220. Therefore, while the area of the display 220 is activated, the user may touch a particular area of the activated area of the display 220. As a result, the photographing apparatus 10 may perform autofocusing on an area of the live image corresponding to the particular area touched by the user, wherein the live image is displayed through the viewfinder 210. If the shutter 230-1 of the input 230 is pressed, the photographing apparatus 10 captures the live image that is autofocused in response to the touch of the user.

The photographing apparatus 10 according to exemplary embodiments has been schematically described. The photographing apparatus 10 will now be described in more detail with reference to FIGS. 2 and 3.

Figure 2:
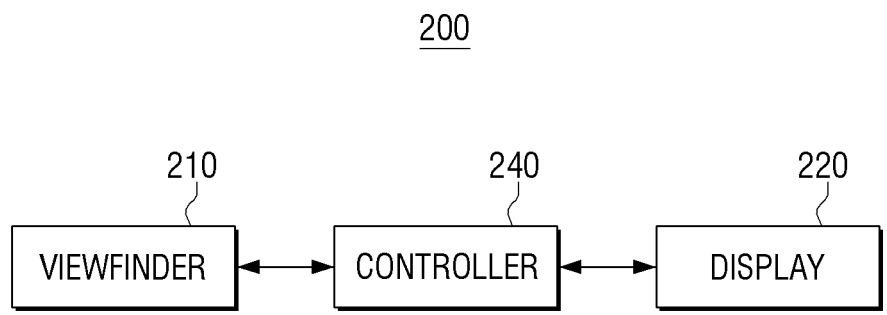
FIG. 2 is a schematic block diagram illustrating a photographing apparatus according to an exemplary embodiment.

FIG. 2 is a schematic block diagram illustrating a photographing apparatus according to an exemplary embodiment.

Figure 3:
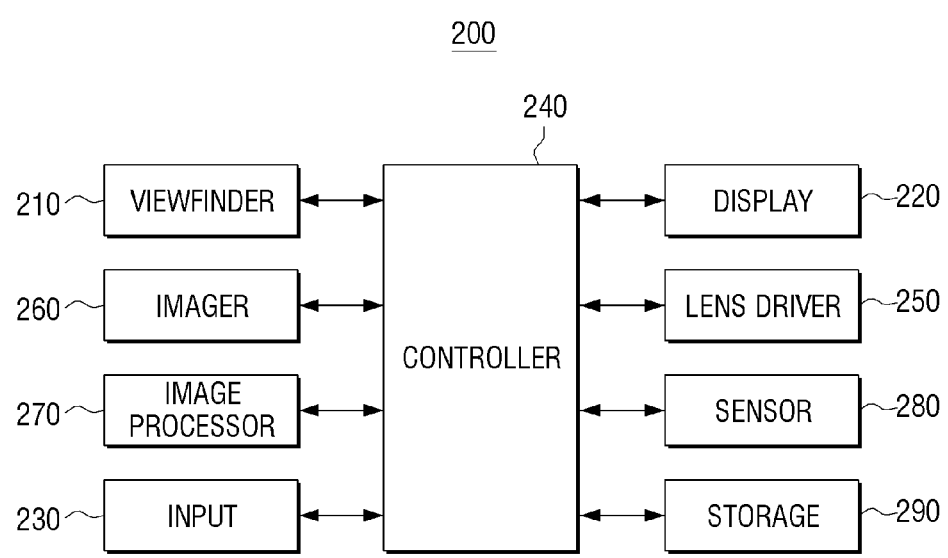
FIG. 3 is a detailed block diagram illustrating a photographing apparatus according to an exemplary embodiment.

FIG. 3 is a detailed block diagram illustrating a photographing apparatus according to an exemplary embodiment.

Referring to FIG. 2, the main body 200 of the photographing apparatus 10 includes the viewfinder 210, the display 220, and a controller 240. Also, as shown in FIG. 3, the main body 200 of the photographing apparatus 10 may further include the input 230, a lens driver 250, an imager 260, an image processor 270, a sensor 280, and a storage 290.

The viewfinder 210 and the display 220 display a live image of a subject to be captured. In particular, the display 220 may display the live image of the subject to be captured, a captured image, and a user interface (UI) for controlling an operation of the photographing apparatus 10. The display 220 may be realized as a liquid crystal display (LCD), an organic light-emitting diode (OLED), a plasma display panel (PDP), or the like. The display 220 may also include a touch panel to receive a touch command of the user.

The controller 240 controls overall operations of elements of the photographing apparatus 10. In particular, the controller 240 may activate at least one of the viewfinder 210 and the display 220 according to whether the user approaches the photographing apparatus 10. Also, if the viewfinder 210 is activated, the controller 240 may activate a set area of a display area of the display 220 for performing an autofocusing function.

Here, the set area may be an area where a touch for setting an autofocusing area of the live image displayed through the viewfinder 210 may be input.

The live image that is displayed on the viewfinder 210 or the display 220 may be generated through elements that will be described below. As shown in FIG. 3, the imager 260 receives external light incident on the lenses 110 and converts the received external light into an electric signal. In detail, if the external light is incident on the plurality of lenses 110 driven by the lens driver 250 to form an image on an imaging surface, the imager 260 converts the external light formed as the image on the imaging surface into an electric signal by using a photoelectric conversion device such as a charge-coupled device (CCD) or a complementary metal oxide semiconductor (CMOS). Here, the lens driver 250 drives the plurality of lenses 110 included in the barrel 100 according to a control command of the controller 240. If positions of the plurality of lenses 110 are changed according to a driving command of the lens driver 250, distances between the plurality of lenses 110 may be adjusted to zoom in or out the subject to be captured or adjust a focus of the subject.

The image processor 270 performs image-processing on row image data of the electric signal converted by the imager 260 to generate the live image of the subject to be captured.

A general method of converting the external light into the electric signal and generating the live image from the electric signal through the imager 260 and the image processor 270 is well known, and thus a detailed description thereof is omitted.

If the live image is generated through the image processor 270, the controller 240 may control the viewfinder 210 and the display 220 to display the live image based on a result of a distance between the viewfinder 210 and the eyes of the user sensed through the sensor 280. In detail, the sensor 280 may sense whether the user approaches the photographing apparatus 10 by measuring an eye point distance between the viewfinder 210 and the eyes of the user. If the eye point distance between the viewfinder 210 and the eyes of the user is measured through the sensor 280, the controller 240 compares the eye point distance with a preset threshold distance. If the eye point distance measured from a distance between the viewfinder 210 and the eyes of the user is greater than or equal to the preset threshold distance, the controller 240 turns off the viewfinder 210 and turns on the display 220. Therefore, the display 220 may be activated to display the live image.

If a touch is input on a particular area of the display 220 while the live image is displayed through the display 220, the controller 240 performs autofocusing on the particular area where the touch is input. If the shutter 230-1 of the input 230 is pressed by the user when autofocusing is performed on an area corresponding to the touch input by the user as described above, the controller 240 may capture the live image that is autofocused according to the touch of the user.

If the eye point distance measured from the viewfinder 210 to the eyes of the user is less than the preset threshold distance, the controller 240 turns off the display 220 and turns on the viewfinder 210. Therefore, the viewfinder 210 may be activated to display the live image. If the viewfinder 210 is activated as described above, the controller 240 turns on a set area of a display area of the display 220 for performing an autofocusing function while the display 220 is inactivated. As described above, the set area may be an area where a touch for setting an autofocusing area of the live image displayed through the viewfinder 210 may be input.

In other words, if the viewfinder 210 is activated, the set area of the display area of the display 220 for setting the autofocusing area of the live image displayed through the viewfinder 210 is activated, and other areas of the display 220 are inactivated.

If the set area is activated, the user may touch a particular area of the activated set area of the display 220 in relation to an area of the live image for performing autofocusing, wherein the live image is displayed through the viewfinder 210. If the touch is input on a particular area of the set area, the controller 240 performs autofocusing on an area corresponding to the touched particular area of the live image.

According to exemplary embodiments, coordinate values of the set area for performing the autofocusing function may correspond to coordinate values of the live image displayed through the viewfinder 210 on a one-to-one basis. If a touch is input on a first area of the set area for performing the autofocusing function, the controller 240 may perform autofocusing on an area having coordinate values corresponding to coordinate values of the touched first area of the live image displayed through the viewfinder 210.

If the shutter 230-1 of the input 230 is pressed by the user when the autofocusing is performed on the area corresponding to the touch input by the user, the controller 240 may capture the live image that is autofocused in response to the touch of the user. Here, the input 230 may include the shutter 230-1 for receiving a capturing command and various types of buttons for controlling an operation of the photographing apparatus 10.

Figure 4:
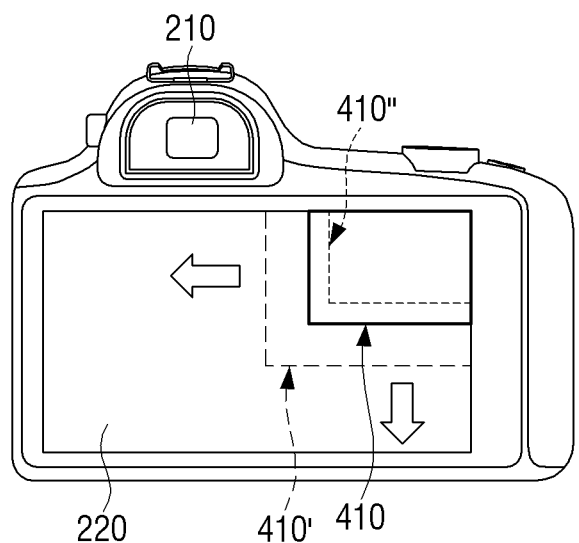
FIG. 4 is a view illustrating a set area for setting an autofocusing area of a live image through a photographing apparatus, according to an exemplary embodiment.

FIG. 4 is a view illustrating a set area for setting an autofocusing area of a live image through a photographing apparatus, according to an exemplary embodiment.

As shown in FIG. 4, if an eye point distance measured from a distance between the viewfinder 210 and the eyes of the user is less than a preset threshold distance, the viewfinder 210 may be activated to display a live image. If the viewfinder 210 is activated as described above, the set area 410 of a display area of the display 220 for setting an autofocusing area of the live image displayed through the viewfinder 210 may be activated, and other areas of the display area may be inactivated.

According to exemplary embodiments, the set area 410 may be formed on a right top of the display area of the display 220, and a guide line for guiding the set area 410 may be marked with a solid line. Therefore the user may check an area of the display 220 in which the set area 410 is formed, through the guide line displayed on the display 220. Also, since the set area 410 is formed on the right top of the display 220, the user may press the shutter 230-1 with an index finger while observing the live image through the viewfinder 210. Simultaneously, the user may touch a particular area of the set area 410 with a thumb to set an autofocusing area of the live image. However, exemplary embodiments are not limited thereto, and the set area 410 may be moved depending on a user setup. The set area 410 may also be enlarged to a size 410' depending on a user setup or may be reduced to a size 410" depending on the user setup.

Therefore, the user may adjust at least one of a movement and a size of the set area 410 so as to enable the set area 410 to be appropriate for an image capturing habit of the user and a size of a finger of the user.

Figure 5:
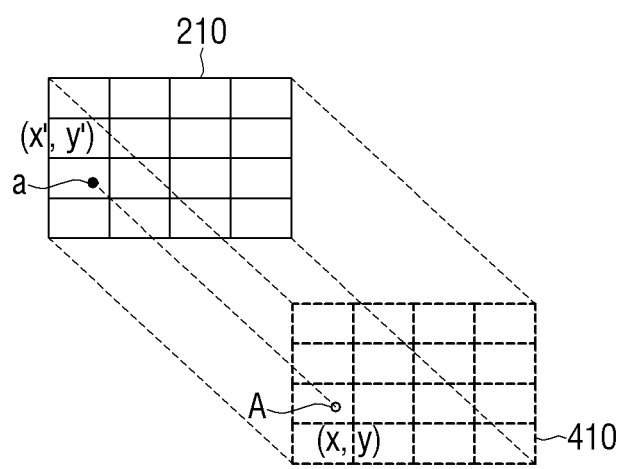
FIG. 5 is a view illustrating a relation between a display area and a set area of a live image of a viewfinder, according to an exemplary embodiment.

FIG. 5 is a view illustrating a relation between a display area and a set area of a live image of a viewfinder, according to an exemplary embodiment.

As shown in FIG. 5, coordinate values of a live image displayed through the viewfinder 210 that is activated may correspond to coordinate values of the set area 410 of a display area of the display 220 for performing an autofocusing function on a one-to-one basis.

For example, the user may touch point A of the set area 410 for performing the autofocusing function. If the point A is touched as described above, the controller 240 acquires coordinate values (x, y) of the point A of the set area 410 touched by the user. Thereafter, the controller 240 may perform autofocusing on an area of the live image having coordinate values (x', y') of point a corresponding to the coordinate values (x, y) of the point A of the set area 410 touched by the user, wherein the live image is displayed through the viewfinder 210.

FIGS. 6A through 6D illustrate autofocusing performed on a live image according to a touch on a set area for performing an autofocusing function through a photographing apparatus, according to an exemplary embodiment.

If an eye point distance between the viewfinder 210 and the eyes of the user is less than a preset threshold distance, the controller 240 turns on the viewfinder 210 and the set area 410 for setting an autofocusing area of a live image displayed through the viewfinder 210. If a touch is not on the set area 410 when the viewfinder 210 and the set area 410 are activated, the controller 240 performs autofocusing on an object corresponding to a preset condition among a plurality of objects included in the live image.

According to an exemplary embodiment, the controller 240 may perform autofocusing on an object belonging to the photographing apparatus 10 and a preset threshold fraction among a plurality of objects included in the live image. According to another exemplary embodiment, the controller 240 may perform autofocusing on an object closest to the photographing apparatus 10 among a plurality of objects included in the live image.

Figure 6A:
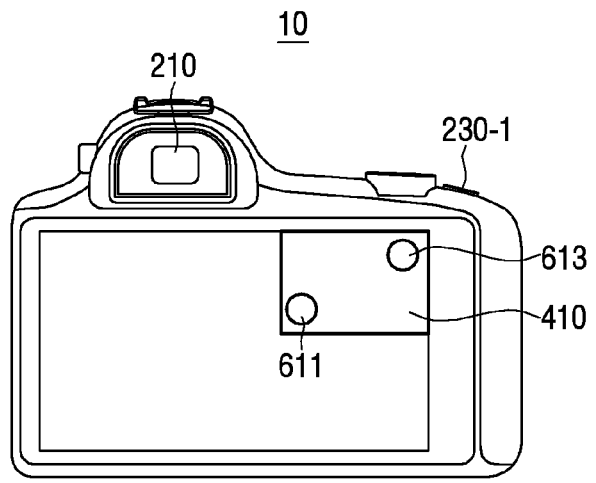
FIGS. 6A through 6D are views illustrating autofocusing performed on a live image according to a touch on a set area, according to an exemplary embodiment.
Figure 6B:
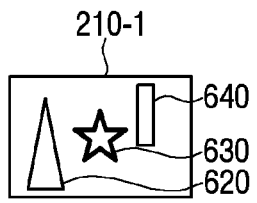

FIG. 6B illustrates autofocusing performed on an object belonging to the photographing apparatus 10 and a preset threshold fraction among a plurality of objects included in the live image. In detail, a live image 210-1 that is displayed through the viewfinder 210 may include first through third objects 620 through 640, and the first object 620 may be closest to the photographing apparatus 10. The second object 630 may be positioned between the first and third objects 620 and 640, and the third object 640 may be positioned farthest from the photographing apparatus 10. The second object 630 may belong to a preset threshold fraction in relation to autofocusing. In this case, the controller 240 may perform autofocusing on the second object 630 to enable the viewfinder 210 to display the live image 210-1 of which the second object 630 is autofocused.

If the shutter 230-1 is pressed when the second object 630 is autofocused, the controller 240 may capture the live image of which the second object 630 is autofocused.

Figure 6C:
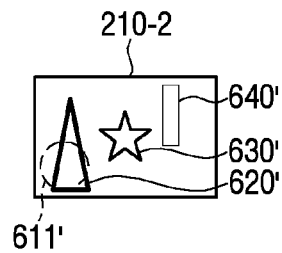
Figure 6D:
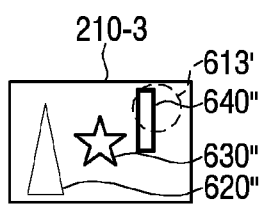

FIGS. 6C and 6D illustrate autofocusing performed on an object corresponding to an area of the set area 410 touched by the user.

As similarly described with reference to FIG. 6B, when the live image 210-1 of which the second object 630 is autofocused is displayed, the user may touch a first area 611 of the set area 410 to autofocus the first object 620. If the touch is input on the first area 611 of the set area 410, the controller 240 performs autofocusing on an area 611' corresponding to the touched first area 611 of the live image 210-1 displayed through the viewfinder 210.

Therefore, as shown in FIG. 6C, the viewfinder 210 may display a live image 210-2 of which a first object 620' is autofocused. If the shutter 230-1 is pressed when the first object 620' is autofocused, the controller 240 may capture the live image 210-2 of which the first object 620' is autofocused. Therefore, an image corresponding to the first object 620' may most clearly appear on an image captured from the live image 210-2 of which the first object 620' is autofocused. Also, an image corresponding to the third object 640' positioned farthest from the first object 620' may most blurredly appear.

As similarly described with reference to FIG. 6B, when the live image 210-1 of which the second object 630 is autofocused is displayed, the user may touch a second area 613 of the set area 410 to autofocus the third object 640. If the touch is input on the second area 613 of the set area 410 as described above, the controller 240 performs autofocusing on an area 613' of the live image 210-1 corresponding to the touched second area 613, wherein the live image is displayed through the viewfinder 210.

Therefore, as shown in FIG. 6D, the viewfinder 210 may display a live image 210-3 of which a third object 640" is autofocused. If the shutter 230-1 is pressed when the third object 640" is autofocused, the controller 240 may capture the live image 210-3 of which the third object 640" is autofocused. Therefore, an image corresponding to the third object 640" may most clearly appear on an image captured from the live image 210-3 of which the third object 640" is autofocused. Also, an image corresponding to a first object 620" positioned farthest from the third object 640" may most blurredly appear.

According to an exemplary embodiment, the controller 240 may perform single autofocusing or multi autofocusing according to a touch area of the user on the set area 410 for performing the autofocusing function.

If a touch area of a touched first area of the set area 410 for setting the autofocusing function is less than a preset threshold area, the controller 240 may perform single autofocusing on an area corresponding to the touched first area. If the touch area of the touched first area is greater than or equal to the preset threshold area or a touch pattern of the touched first area is a preset pattern, the controller 240 may perform multi autofocusing on an area corresponding to the touched first area.

Figure 7A:
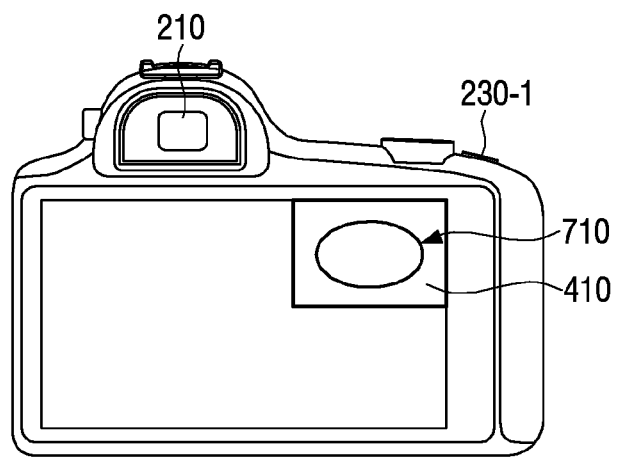
FIGS. 7A through 7C are views illustrating multi autofocusing performed on a whole area of a live image according to a touch on a set area, according to an exemplary embodiment.
Figure 7B:
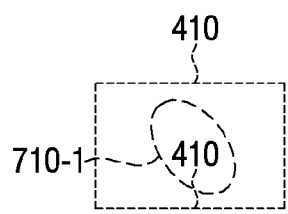
Figure 7C:
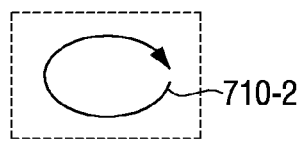

FIGS. 7A through 7C are views illustrating multi autofocusing performed on a whole live image according to a touch on a set area for performing an autofocusing function through a photographing apparatus, according to an exemplary embodiment.

If an eye point distance between the viewfinder 210 and the eyes of the user is less than a preset threshold distance, the controller 240 turns on the viewfinder 210 and the set area 410 for setting an autofocusing area of a live image displayed through the viewfinder 210. Therefore, the viewfinder 210 may display a live image of a subject to be captured, and an area of the display 220 may be activated as the set area 410 for setting an autofocusing area of the live image displayed through the viewfinder 210.

When the set area 410 for setting the autofocusing area of the live image displayed on the viewfinder 210 is activated, the controller 240 may determine whether to perform multi autofocusing according to a touch of the user on the set area 410 for performing the autofocusing function.

According to an exemplary embodiment, the controller 240 may determine whether to perform multi autofocusing according to a touch area of the user on the set area 410 for performing the autofocusing function.

As shown in FIGS. 7A through 7C, the user may touch a first area 710 or 710-1 of the set area 410. If the touch on the first area 710 or 710-1 is input as described above, the controller 240 compares a touch area of the touched first area 710 or 710-1 with a whole area of the set area 410 to determine whether the touch area of the first area 710 or 710-1 is greater than or equal to a preset threshold area. According to exemplary embodiments, the controller 240 may determine the touch area of the first area 710 or 710-1 from a ratio between the total number of coordinate points formed in the set area 410 and the number of coordinate points formed in the touched first area 710 or 710-1. If the touch area of the first area 710 or 710-1 is determined as described above, the controller 240 compares the touch area of the first area 710 or 710-1 with a preset threshold area. If the touch area of the first area 710 or 710-1 is greater than or equal to the preset threshold area, the controller 240 determines the touch input of the user as a multi autofocusing performance command and performs autofocusing on a whole area of the live image displayed through the viewfinder 210.

According to another exemplary embodiment, the controller 240 may determine whether to perform multi autofocusing according to a touch pattern of the user on the set area 410 for performing the autofocusing function.

As shown in FIG. 7C, the user may perform a touch of a pattern drawing a circle in a clockwise direction in the set area 410. If the touch is input as described above, the controller 240 may compare the touched touch pattern with a preset touch pattern to determine whether to perform multi autofocusing. Here, the preset touch pattern may be set to various types of patterns according to a setup of the user. If the touch pattern touched by the user matches the preset touch pattern, the controller 240 determines the touch of the user as an autofocusing performance command and performs autofocusing on a whole area of the live image displayed through the viewfinder 210.

However, exemplary embodiments are not limited thereto, and thus if a touch of a pattern drawing a circle in a clockwise direction in the set area 410 is input, the controller 240 may determine whether to perform multi autofocusing according to whether coordinate values corresponding to the input touch are all formed in a preset fraction. In detail, the controller 240 may divide the set area 410 into four areas based on coordinate values forming the set area 410. Therefore, if the touch of the pattern drawing the circle in the clockwise direction in the set area 410 is input, the controller 240 may determine whether to perform autofocusing according to whether coordinate values corresponding to the input touch are respectively included in the four areas into which the set area 410 is arbitrarily divided.

If capturing is performed when the multi autofocusing is performed on the whole area of the live image as described above, an image that is autofocused on a plurality of objects included in the live image may be captured.

Figure 8A:
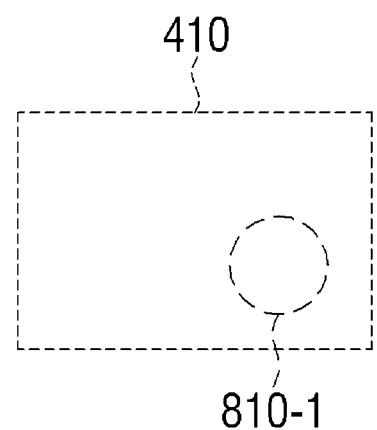
FIGS. 8A and 8B are views illustrating multi autofocusing performed on a particular area of a live image according to a touch on a set area, according to an exemplary embodiment.
Figure 8B:
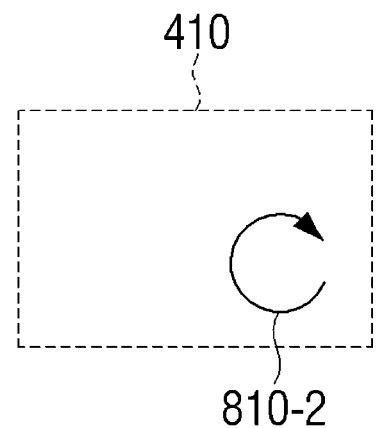

FIGS. 8A and 8B are views illustrating multi autofocusing performed on a particular area of a live image according to a touch of a set area for performing an autofocusing function through a photographing apparatus, according to an exemplary embodiment.

If an eye point distance between the viewfinder 210 and the eyes of the user is less than a preset threshold distance as described above, the controller 240 turns on the viewfinder 210 and the set area 410 for setting the autofocusing area of the live image displayed through the viewfinder 210. Therefore, the viewfinder 210 may display a live image of a subject to be captured, and an area of the display 220 may be activated as the set area 410 for setting an autofocusing area of the live image displayed on the viewfinder 210.

When the set area 410 for setting the autofocusing area of the live image displayed on the viewfinder 210 is activated, the controller 240 may determine whether to perform multi autofocusing on a particular area of the live image according to a touch of the user on the set area 410 for performing the autofocusing function.

According to an exemplary embodiment, the controller 240 may determine whether to perform multi autofocusing on the particular area according to a touch area of the user on the set area 410 for performing the autofocusing function.

As shown in FIG. 8A, the user may touch a first area 810-1 of the set area 410. If the touch is input on the first area 810-1 as described above, the controller 240 compares a touch area of the touched first area 810-1 with a whole area of the set area 410 to determine whether the touch area of the first area 810-1 is formed in a preset threshold area fraction. According to exemplary embodiments, the controller 240 may determine the touch area of the first area 810-1 from a ratio between the total number of coordinate points formed in the set area 410 and the number of coordinate points formed in the first area 810-1. If the touch area of the first area 810-1 is determined as described above, the controller 240 compares the touch area of the first area 810-1 with a preset threshold area.

If the touch area of the first area 810-1 exceeds the preset threshold area fraction, the controller 240 may perform autofocusing on the whole area of the live image as described with reference to FIGS. 7A through 7C. If the touch area of the first area 810-1 is less than the preset threshold area fraction, the controller 240 may perform a single autofocusing operation on an area of the live image corresponding to the first area 810-1.

If the touch area of the first area 810-1 is formed in the preset threshold area fraction, the controller 240 determines the touch input of the user as a multi autofocusing performance command of a particular area. The controller 240 performs multi autofocusing on a particular area of the live image corresponding to the first area 810-1, wherein the live image is displayed through the view finder 210.

According to another exemplary embodiment, the controller 240 may determine whether to perform multi autofocusing on the particular area according to a touch pattern of the user on the set area 410 for performing the autofocusing function.

As shown in FIG. 8B, the user may perform a touch a pattern drawing a circle in a clockwise direction in the set area 410. If the touch is input as described above, the controller 240 may compare a touched touch pattern 810-2 with a preset touch pattern to determine whether to perform multi autofocusing on the particular area. Here, the preset touch pattern may be set to various types of patterns according to a setup of the user. If the touch pattern 810-2 touched by the user matches the preset touch pattern, the controller 240 determines the touch of the user as a multi autofocusing performance command of the particular area.

If the touch of the user is determined as the multi autofocusing performance command of the particular area, the controller 240 determines an area including the largest number of coordinate values depending on a touch of the user among the four areas into which the set area is arbitrarily divided. Thereafter, the controller 240 performs multi autofocusing on a particular area corresponding to the area of the live image determined from the coordinate values depending on the touch of the user.

If capturing is performed when the multi autofocusing is performed on the particular area as described above, an image, which is autofocused in at least two or more objects included in the particular area corresponding to the first area 810-1 among a plurality of objects included in the live image, may be captured FIGS. 9A through 9D illustrate autofocusing performed on a live image based on an interested object of the user through a photographing apparatus, according to an exemplary embodiment.

If an eye point distance between the viewfinder 210 and the eyes of the user is less than a preset threshold distance as described above, the controller 240 turns on the viewfinder 210 and the set area 410 for setting an autofocusing area of a live image displayed through the viewfinder 210. Therefore, the viewfinder 210 may display a live image of a subject to be captured, and an area of the display 220 may be activated as the set area 410 for setting an autofocusing area of the live image displayed on the viewfinder 210.

The controller 240 may perform initial autofocusing according to a preset condition in relation to the live image of the subject to be captured. According to exemplary embodiments, the storage 290 may classify and store captured images according to categories based on capturing information of the captured images. Here, the capturing information may be autofocusing information that is applied to the captured images.

For example, object-related autofocusing may be performed on first and second images, character-related autofocusing may be performed on third through fifth images, and background-related autofocusing may be performed on sixth through tenth images. In this case, the storage 290 may classify and store the first and second images as an object-related category, classify and store the third through fifth images as a character-related category, and classify and store the sixth through tenth images as a background-related category.

Figure 9A:
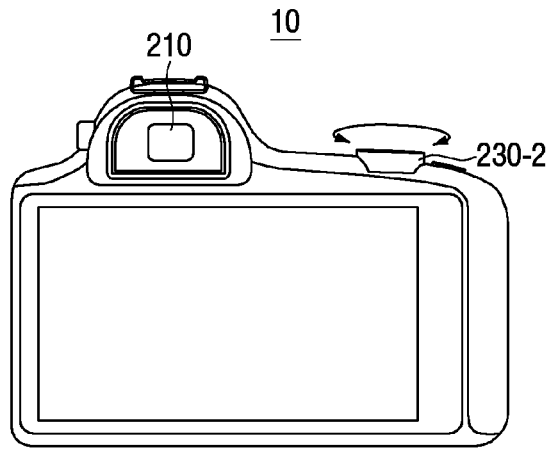
FIGS. 9A through 9D are views illustrating autofocusing performed on a live image based on an interested object of a user through a photographing apparatus, according to an exemplary embodiment.
Figure 9B:
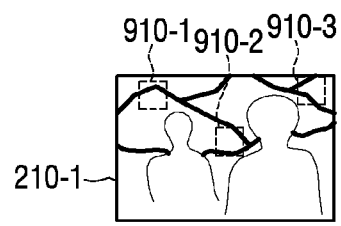

Therefore, the controller 240 may perform autofocusing on the live image of the subject to be captured, with reference to a distribution of images that are classified according to categories. If the largest number of images are classified into a background-related category, and a background is included in the subject to be captured as described above, the controller 240 may perform autofocusing on an area of the live image corresponding to the background. Therefore, as shown in FIG. 9B, the viewfinder 210 may display a live image 210-1 including a plurality of areas 910-1 through 910-3 in which a background-related object is displayed and autofocused.

Figure 9C:
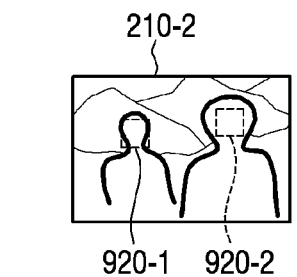

When the live image 210-1 including the plurality of areas 910-1 through 910-3 in which the background-related object is displayed, the user may manipulate a key manipulator 230-2 provided in the photographing apparatus 10 so as to perform autofocusing from a background basis to a character basis. If a manipulation command, as described above, is input, the controller 240 may perform autofocusing from the background basis to the character basis. Therefore, as shown in FIG. 9C, the viewfinder 210 may display a live image 210-2 including a plurality of areas 920-1 and 920-2 in which a character-related object is displayed and autofocused.

When the live image 210-2 including the plurality of areas 920-1 and 920-2 which are related to a character and autofocused is displayed, the user may manipulate the key manipulator 230-2 provided in the photographing apparatus 10 so as to perform autofocusing based on a particular character. If a manipulation command as described above is input, the controller 240 may perform autofocusing on a character of the area 920-2 corresponding to the input manipulation command among the plurality of areas 920-1 and 920-2. Here, the key manipulator 230-2 may be the input 230 that may rotate in right and left directions.

Figure 9D:
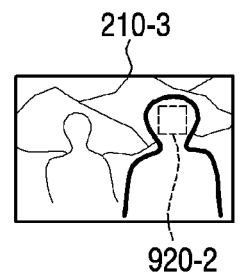

Therefore, if the user rotates the key manipulator 230-2 in the right direction, the controller 240 may perform autofocusing on the character of the area 920-2 corresponding to a manipulation command of the right direction among the plurality of areas 920-1 and 920-2 that are autofocused. Therefore, as shown in FIG. 9D, the viewfinder 210 may display a live image 210-3 including the area 920-2 which corresponds to a manipulation command of the user and is autofocused among the plurality of areas 920-1 and 920-2 in which the character-related object is displayed.

If the user rotates the key manipulator 230-2 in the left direction, the controller 240 may perform autofocusing on a character of the area 920-1 corresponding to the manipulation command of the left direction among the plurality of areas 920-1 and 920-2 that are autofocused. In this case, the viewfinder 210 may display the live image 210-3 including the area 920-1 which corresponds to the manipulation command of the user and is autofocused among the plurality of areas 920-1 and 920-2 in which the character-related object is displayed.

Elements of the photographing apparatus 10 consistent with exemplary embodiments have been described in detail.

A photographing method of the photographing apparatus 10 according to an exemplary embodiment will now be described in detail.

Figure 10:
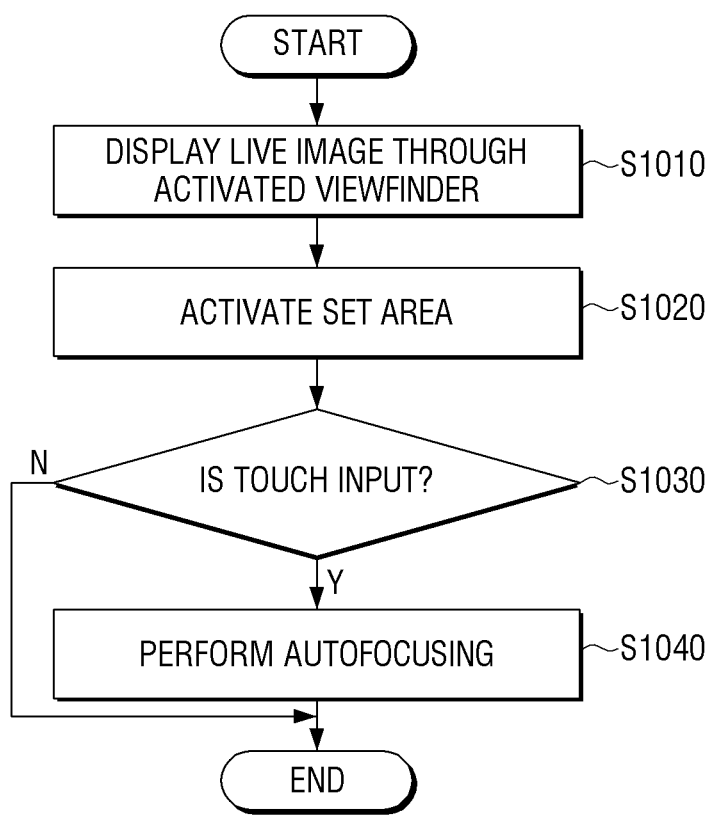
FIG. 10 is a flowchart illustrating a photographing method, according to an exemplary embodiment.

FIG. 10 is a flowchart illustrating a photographing method of a photographing apparatus according to an exemplary embodiment.

Referring to FIG. 10, if a user approaches the photographing apparatus 10, the photographing apparatus 10 activates a viewfinder and a display that display a live image through the activated viewfinder in operation S1010. Here, the viewfinder may be an EVF, and the photographing apparatus 10 may be a CSC to which the EVF is applied. If the live image is displayed through the activated viewfinder, the photographing apparatus 10 activates a set area of a display area of the inactivated display for performing an autofocusing function in operation S1020. Here, the set area for performing the autofocusing function may be an area where a touch for setting an autofocusing area of the live image displayed through the viewfinder may be input. The set area may be moved within the display area of the display, and a size of the set area may be adjusted according to a user setup.

Operations S1010 and 1020 described above may be simultaneously performed. In other words, if the viewfinder is activated, the photographing apparatus 10 may simultaneously activate the set area of the display area of the display for performing the autofocusing function. The method of activating at least one of the viewfinder and the display that displays the live image according to whether the user approaches the photographing apparatus 10 will be described in more detail later with reference to FIG. 11.

When the viewfinder and the set area for performing the autofocusing function are activated, the photographing apparatus 10 determines whether a touch is input on the activated set area in operation S1030. If it is determined in operation S1030 that the touch is input on the activated set area, the photographing apparatus 10 performs autofocusing on the live image displayed through the viewfinder in operation S1040.

According to exemplary embodiments, coordinate values of the set area for performing the autofocusing function may match coordinate values of the live image displayed through the viewfinder on a one-to-one correspondence basis. Therefore, if a touch is input on a first area of the set area for performing the autofocusing function, the photographing apparatus 10 may perform autofocusing on an area of the live image having coordinate values corresponding to coordinate values of the touched first area, wherein the live image is displayed through the viewfinder.

If a shutter provided in the photographing apparatus 10 is pressed by the user when the autofocusing is performed on the area corresponding to the touch input of the user, the photographing apparatus 10 may capture the live image that is autofocused in response to the touch of the user.

The photographing apparatus 10 may analyze a touch state of the set area for performing autofocusing on the live image displayed through the viewfinder to perform a single autofocusing function or a multi autofocusing function.

According to an exemplary embodiment, the photographing apparatus 10 may perform the single autofocusing function or the multi autofocusing function according to a touch area of the set area for performing autofocusing on the live image displayed through the viewfinder. In detail, if the touch area of the touched first area of the set area for performing the autofocusing function is less than a preset threshold area, the photographing apparatus 10 performs single autofocusing on an area corresponding to the first area. If the touch area of the touched first area is greater than or equal to the preset threshold area, the photographing apparatus 10 performs multi autofocusing on the area corresponding to the first area.

According to another exemplary embodiment, the photographing apparatus 10 may perform the single autofocusing function or the multi autofocusing function according to a touch pattern of the set area for performing the autofocusing function. In detail, if a touch is input on the set area for performing the autofocusing function, the photographing apparatus 10 determines whether the touch pattern of the touched first area matches a preset pattern. If it is determined that the touch pattern of the first area matches the preset pattern, the photographing apparatus 10 performs multi autofocusing on an area of the live image corresponding to the first area, wherein the live image is displayed through the viewfinder. Here, the first area on which the multi autofocusing is performed may be a whole area of the live image or a particular area of areas of the live image.

According to another exemplary embodiment, the photographing apparatus 10 may perform autofocusing on an area in which an object corresponding to an interested object of the user is displayed among a plurality of objects included in the live image, based on capturing information of a plurality of images that are pre-stored and display an auto-focused live image through the viewfinder. Here, the capturing information may be autofocusing information that is applied to the captured images.

If an autofocusing change command is input when at least one of a plurality of objects included in a live image is autofocused, the photographing apparatus 10 performs autofocusing on an area in which at least one object belonging to a preset category is displayed among the other objects except the autofocused object. If a plurality of objects belong to a preset category, the photographing apparatus 10 performs autofocusing on an area in which one of a plurality of objects is displayed according to a selection command of the user.

In detail, the photographing apparatus 10 may classify and store captured images according to categories based on capturing information of the captured images. For example, if it is determined that the largest number of images are classified into a background-related category among the captured images, the photographing apparatus 10 may perform autofocusing on an area of the live image corresponding to a background.

If an autofocusing change command is input when a live image including an autofocused background-related area is displayed, the photographing apparatus 10 may perform autofocusing from a background basis to a character basis. A live image, which includes a plurality of areas that are autofocused in relation to a character, may be displayed. If a selection command of the user is input when the live image including the plurality of areas that are autofocused in relation to the character is displayed, the photographing apparatus 10 may perform autofocusing on a character of an area corresponding to the input selection command.

The method of performing autofocusing a live image displayed through the viewfinder by using the activated set area through the photographing apparatus 10 has been described in detail. A method of activating a viewfinder that displays a live image and a set area for performing autofocusing on a live image displayed through the viewfinder through the photographing apparatus 10 will now be described in detail.

Figure 11:
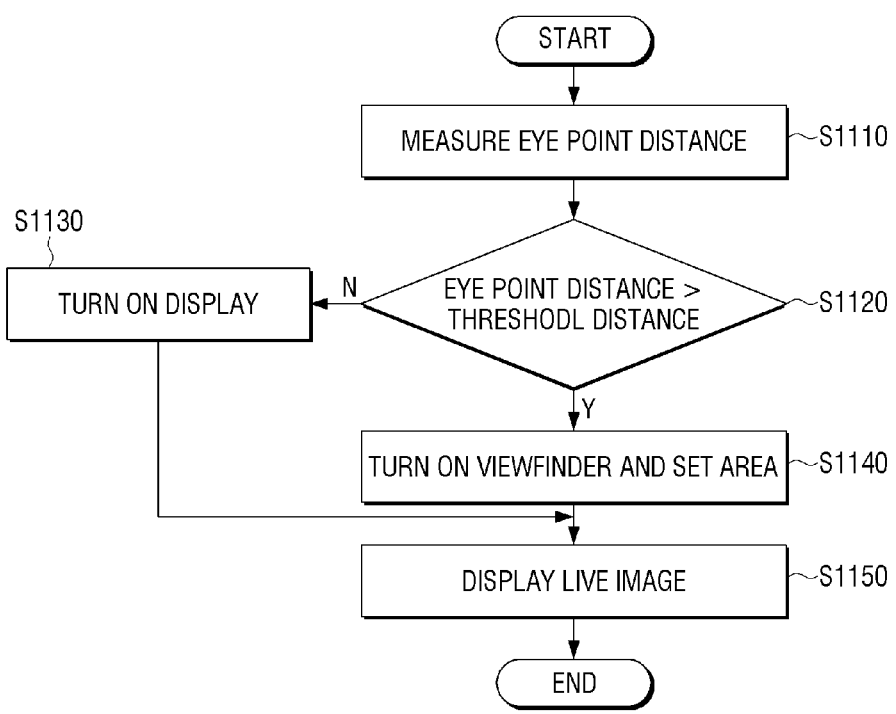
FIG. 11 is a flowchart illustrating a method of activating a viewfinder and a set area through a photographing apparatus, according to an exemplary embodiment.

FIG. 11 is a flowchart illustrating a method of activating a viewfinder and a set area through a photographing apparatus, according to an exemplary embodiment.

Referring to FIG. 11, in operation S1110, the photographing apparatus 10 measures an eye point distance between a viewfinder and eyes of a user through a sensor that is formed around the viewfinder. In operation S1120, the photographing apparatus 10 compares the eye point distance with a preset threshold distance. If the eye point distance between the viewfinder and the eyes of the user is greater than or equal to the preset threshold distance in operation S1120, the photographing apparatus 10 turns off the viewfinder and turns on a display in operation S1130. Therefore, the viewfinder may be inactivated, and the display may be activated to display a live image of a subject to be captured.

If the eye point distance between the viewfinder and the eyes of the user is less than the preset threshold distance in operation S1120, the photographing apparatus 10 turns on the viewfinder and the set area of a display area of the display for performing an autofocusing function in operation S1140. In other words, the photographing apparatus 10 turns off other areas of the display area of the display except the set area and turns on the viewfinder and the set area. In operation S1150, the photographing apparatus 10 displays the live image of the subject to be captured through the activated viewfinder. If a touch is input on the activated set area while the live image is displayed through the viewfinder, the photographing apparatus 10 may perform autofocusing on an area of the live image corresponding to a touched point of the set area, wherein the live image is displayed through the viewfinder.

According to exemplary embodiments as described above, if a photographing apparatus displays a live image through a viewfinder, the photographing apparatus may activate an area of a display area of a display for performing autofocusing on a live image. Therefore, a user may intuitively perform an autofocusing operation on the live image with observing the live image displayed through the viewfinder.

The foregoing exemplary embodiments and advantages are merely exemplary and are not to be construed as limiting. The present teaching can be readily applied to other types of apparatuses. Also, the description of exemplary embodiments is intended to be illustrative, and not to limit the scope of the claims, and many alternatives, modifications, and variations will be apparent to those skilled in the art.

What is claimed is:

1. A photographing apparatus comprising:
a photoelectric sensor configured to generate an image signal based on external light incident on the photoelectric sensor;
a viewfinder configured to display a live image based on the image signal;
a display configured to display the live image based on the image signal and receive a touch input; and
a controller configured to:
activate the display and inactivate the viewfinder in response to an eye point distance between a user and the photographing apparatus being greater than or equal to a preset threshold distance; and
activate the viewfinder and activate a specific area of a full area of the display as a focus control area for performing an autofocusing function with respect to the live image in response to the eye point distance being less than the preset threshold distance,
wherein the focus control area is an area where a touch for setting an autofocusing area of the live image displayed through the viewfinder is input, and wherein the controller performs the autofocusing function on an area of the live image which corresponds to the touched area on the focus control area.

2. The photographing apparatus of claim 1, wherein the controller is further configured to determine the autofocusing area by matching corresponding coordinate values of the focus control area with coordinate values of the live image on a one-to-one correspondence basis.

3. The photographing apparatus of claim 1, wherein in response to a touch being input on a first area of the focus control area, the controller is further configured to determine an area of the live image having coordinate values corresponding to coordinate values of the first area as the autofocusing area.

4. The photographing apparatus of claim 1, further comprising:
a sensor configured to sense the eye point distance,
wherein in response to the eye point distance being less than the preset threshold distance, the controller is further configured to turn off an area of the display excluding the focus control area.

5. The photographing apparatus of claim 3, wherein the controller is further configured to:
perform single autofocusing on the autofocusing area in response to an area of the touched first area being less than a preset threshold area; and
perform multi autofocusing on the autofocusing area in response to the area of the touched first area being greater than or equal to the preset threshold area.

6. The photographing apparatus of claim 5, wherein in response to a touch pattern of the touch input on the focus control area corresponding to a preset pattern, the controller is further configured to perform multi autofocusing on the autofocusing area.

7. The photographing apparatus of claim 1, further comprising:
a storage configured to store captured images and information corresponding to the captured images,
wherein the controller is further configured to determine an area that displays an interested object among a plurality of objects in the live image as the autofocusing area, based on the information corresponding to the captured images stored in the storage.

8. The photographing apparatus of claim 7, further comprising:
an input configured to receive a user command,
wherein in response to autofocusing being performed on the area that displays the interested object and an autofocusing change command being input through the input, the controller is further configured to determine an area that displays at least one object belonging to a preset category among other objects as the autofocusing area.

9. The photographing apparatus of claim 8, wherein in response to two of the plurality of objects belonging to the preset category, the controller is further configured to determine an area that displays one of the plurality of objects according to a selection command input through the input as the autofocusing area.

10. The photographing apparatus of claim 1, wherein the controller is further configured to adjust at least one selected from a position and a size of the focus control area according to a user command.

11. A photographing method of a photographing apparatus, the photographing method comprising:
generating an image signal based on external light incident on a photoelectric sensor;

activating the display and inactivating the viewfinder in response to an eye point distance between a user and the photographing apparatus being greater than or equal to a preset threshold distance;
in response to the viewfinder being activated, displaying a live image through the viewfinder based on the image signal;
activating the viewfinder and a specific area of a full area of the display as a focus control area for performing an autofocusing function with respect to the live image in response to the eye point distance being less than the preset threshold distance; and
in response to a touch being input on the activated focus control area, performing autofocusing on the live image displayed through the viewfinder,
wherein the focus control area is an area where a touch for setting an autofocusing area of the live image displayed through the viewfinder is input, and
wherein the autofocusing is performed on an area of the live image which corresponds to the touched area on the focus control area.

12. The photographing method of claim 11, further comprising determining the autofocusing area by matching corresponding coordinate values of the focus control area with coordinate values of the live image on a one-to-one correspondence basis.

13. The photographing method of claim 11, further comprising determining, in response to a touch input on a first area of the focus control area, the autofocusing area is as an area of the live image having coordinate values corresponding to coordinate values of the first area.

14. The photographing method of claim 11, further comprising in response to the eye point distance being less than the preset threshold distance, turning off an area of the display excluding the focus control area.

15. The photographing method of claim 13, wherein the autofocusing comprises performing single autofocusing in response to an area of the touched first area being less than a preset threshold area, and
the autofocusing comprises multi autofocusing in response to the area of the touched first area being greater than or equal to the preset threshold area.

16. The photographing method of claim 15, wherein the autofocusing further comprises, in response to a touch pattern of the touch input on the focus control area corresponding to a preset pattern, multi autofocusing is performed on the autofocusing area.

17. The photographing method of claim 11, further comprising determining an area that displays an interested object among a plurality of objects in the live image as the autofocusing area based on pre-stored information corresponding to captured images.

18. The photographing method of claim 17, wherein the determining the area further comprises, in response to autofocusing being performed on the area that displays the interested object and an autofocusing change command being input, determining an area that displays at least one object belonging to a preset category among other objects as the autofocusing area.

19. The photographing method of claim 18, wherein in response to two of the plurality of objects belonging to the preset category, determining an area that displays one of the plurality of objects according to a selection command of the user as the autofocusing area.

20. The photographing method of claim 11, wherein the performing autofocusing further comprises adjusting at least one selected from a position and a size of the focus control area according to a user command.

21. An imaging apparatus comprising:
a first display configured to be viewed through a viewfinder;
a second display comprising a touch panel;
an imager comprising a focusable lens, and configured to capture an outside image and generate an image signal based on the outside image;
a sensor configured to sense a user distance between a user and the imaging apparatus; and
a controller configured to:
compare the user distance to a threshold value;
in response to determining that the user distance is less than the threshold value, control the first display to display the outside image using the image signal, activate a specific area of a full area of the touch panel as a focus control area for performing an autofocusing function with respect to the outside image, and control the focusable lens based on an input to the touch panel; and
in response to determining that the user distance is greater than or equal to the threshold value, activate the second display and inactivate the first display, and
wherein the controller performs the autofocusing function on an area of the outside image which corresponds to the touched area on the focus control area.

22. The imaging apparatus of claim 21, wherein the controller is further configured to control an autofocusing area of the outside image based on the input.

23. The imaging apparatus of claim 21, wherein the controller is further configured to determine an interested object of a plurality of objects in the outside image and control an autofocusing area of the outside image based on the interested object.

24. The imaging apparatus of claim 23, wherein the interested object is determined based on focal points of stored images.

* * * * *